United States Patent
Kulkarni et al.

(10) Patent No.: US 10,754,450 B2
(45) Date of Patent: Aug. 25, 2020

(54) ADJUSTABLE STYLUS

(71) Applicant: Microsoft Technology Licensing, LLC, Redmond, WA (US)

(72) Inventors: Prajakta Ashish Kulkarni, Redmond, WA (US); Ashish Arvind Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/235,156

(22) Filed: Dec. 28, 2018

(65) Prior Publication Data
US 2020/0209990 A1 Jul. 2, 2020

(51) Int. Cl.
G06F 3/0354 (2013.01)
(52) U.S. Cl.
CPC ................. *G06F 3/03545* (2013.01)
(58) Field of Classification Search
CPC .................................................. G06F 3/03545
See application file for complete search history.

(56) References Cited

U.S. PATENT DOCUMENTS

| | | | |
|---|---|---|---|
| 3,359,559 A | 12/1967 | Guinn | |
| 5,372,363 A | 12/1994 | Siddle | |
| 6,390,641 B1 * | 5/2002 | Liu | B43K 29/10 362/109 |
| 6,567,523 B1 | 5/2003 | Ghassabian | |
| 7,004,597 B2 | 2/2006 | Kukuk | |
| D694,238 S | 11/2013 | Du | |
| 2011/0227880 A1 * | 9/2011 | Liang | B43K 24/00 345/179 |

FOREIGN PATENT DOCUMENTS

| | | |
|---|---|---|
| DE | 202014006181 U1 | 8/2014 |
| FR | 2203180 A1 | 5/1974 |
| KR | 20050111844 A | 11/2005 |
| TW | I626564 B | 6/2018 |
| WO | 2017160544 A1 | 9/2017 |

OTHER PUBLICATIONS

"Stylus? Pointer? You Don't Have to Choose!", https://www.ipevo.com/howto/post/stylus-pointer-you-dont-have-to-choose, Sep. 6, 2012, 4 Pages.
"International Search Report and Written Opinion Issued in PCT Application No. PCT/US19/066114", dated Mar. 19, 2020, 13 Pages.

* cited by examiner

*Primary Examiner* — Amit Chatly
(74) *Attorney, Agent, or Firm* — Schwegman Lundberg & Woessner, P.A.

(57) ABSTRACT

A stylus includes a cover having a base fastener. A base segment is secured to the cover. An intermediate segment includes an intermediate stop and an intermediate fastener. The intermediate segment being longitudinally movable inside the base segment. The intermediate segment is movable between a closed position where the intermediate fastener engages the base fastener and an open position where a base spring biases the intermediate stop away from the cover to expose the intermediate segment. An end segment includes an end stop and an end fastener. The end segment being longitudinally movable inside the intermediate segment. The end segment is movable between a closed position where the end segment engages the intermediate stop and an open position where an intermediate spring biases the end stop away from the intermediate stop to expose the end segment. A tip for engaging a touch-sensitive electronic device extends from the end segment.

17 Claims, 14 Drawing Sheets

ADJUSTABLE STYLUS

TECHNICAL FIELD

Embodiments described herein generally relate to a stylus for use with an electronic device, and in particular, but without limitation, to an adjustable stylus that may be sized to a user's preferences.

BACKGROUND

A stylus may be used to provide precise touch input to a touch sensing device. A stylus may be shaped to mimic a traditional writing utensil, such as a pen or pencil, thus allowing a user to provide accurate touch input in a familiar manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example stylus includes a cover and a base fastener supported by the cover. A base segment is secured to the cover. A base spring engages the cover and is disposed at least partially within the base segment. An intermediate segment includes an intermediate stop and an intermediate fastener that form part of the intermediate segment. The intermediate segment is longitudinally movable inside the base segment such that the intermediate segment is movable between a closed position where the intermediate fastener engages the base fastener and an open position where the base spring biases the intermediate stop away from the cover such that a portion of the intermediate segment extends longitudinally from the base segment. An intermediate spring engages the base stop and is at disposed least partially within the intermediate segment. An end segment includes an end stop and an end fastener that form part of the end segment. The end segment is longitudinally movable inside the intermediate segment such that the end segment is movable between a closed position where the end segment engages the intermediate stop and an open position where the intermediate spring biases the end stop away from the intermediate stop such that a portion of the end segment extends longitudinally from the intermediate segment. A tip for engaging a touch-sensitive electronic device extends from the end segment.

In another form, the stylus includes a cover and a base fastener supported by the cover. A base segment is secured to the cover. An intermediate segment includes an intermediate fastener. The intermediate segment is longitudinally movable inside the base segment such that the intermediate segment is movable between a closed position where the intermediate fastener engages the base fastener and an open position. An end segment includes an end fastener. The end segment is longitudinally movable inside the intermediate segment such that the end segment is movable between a closed position where the end segment engages the intermediate fastener and an open position. A tip for engaging a touch-sensitive electronic device extends from the end segment. The intermediate segment is movable within the base segment between an open position and a closed positioned independently of maneuvering the end segment.

In still another form, the stylus includes a cover and a base fastener supported by the cover. A base segment is secured to the cover. A base spring engages the cover and is disposed at least partially within the base segment. An intermediate segment includes an intermediate stop and an intermediate magnet that forms part of the intermediate segment. The intermediate segment is longitudinally movable inside the base segment such that the intermediate segment is movable between a closed position where the intermediate magnet engages the base magnet and an open position where the base spring biases the intermediate stop away from the cover such that a portion of the intermediate segment extends longitudinally from the base segment. An intermediate spring engages the base stop and is disposed at least partially within the intermediate segment. An end segment includes an end stop and an end magnet that form part of the end segment. The end segment is longitudinally movable inside the intermediate segment such that the end segment is movable between a closed position where the end magnet engages the intermediate stop and an open position where the intermediate spring biases the end stop away from the intermediate stop such that a portion of the end segment extends longitudinally from the intermediate segment. A tip for engaging a touch-sensitive electronic device extends from the end segment.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

One of the drawbacks with existing stylus designs is that they are typically only sized for two working positions. A closed position, which is often too short to promote ergonomic efficacy, and an open position, which is too long to provide a proper ergonomic feel for a user and also makes the stylus more difficult to store.

Existing attempts to design an adjustable stylus have been inadequate. A typical stylus either lacks the ability to be adjusted to more than the open and closed positions, or lacks stability when the stylus is manipulated into anything other than the closed position.

In addition, the thickness of the stylus is typically fixed in the open and closed position as well as any position between the open and closed position. Each length of the stylus has only one thickness associated with that particular length. Therefore, if a user determines a suitable ergonomic length, then the corresponding thickness may not be ergonomically preferable to the user (or vice versa).

The present disclosure describes a stylus that is capable of being manipulated into a reduced footprint. The reduced footprint allows for easier storage of the stylus, especially since one of the primary functions of a stylus is to be used with an electronic device. As an example, the ability to store a stylus may be practical when the electronic device is portable (e.g., a phone, tablet or laptop).

Some aspects of the subject technology are focused on a stylus that is readily able to provide a suitable ergonomic design for different users. Some users may prefer a longer or shorter stylus and other users may prefer a thinner or thicker stylus. The example styli described herein allow users to easily manipulate the stylus more toward their customized ergonomic size.

Enhancing the ergonomic feel for a user promotes a higher quality experience when using a stylus with an electronic device. The higher quality experience may promote a superior work product and longer work intervals when utilizing a stylus.

Figure 1:
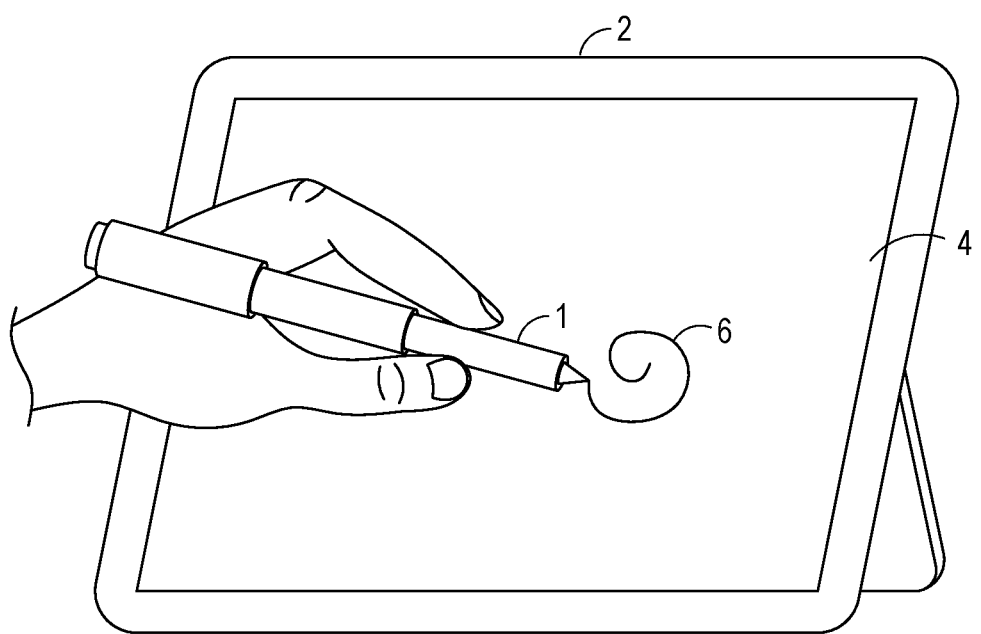
FIG. 1 is a line diagram perspective view of a stylus interacting with a touch-sensitive display device.

FIG. 1 shows a stylus 1 interacting with a touch-sensitive display device 2. The touch-sensitive display device 2 includes a touch sensor 4 configured to detect touch input from one or more touch sources, such as the stylus 1. The touch sensor 4 may be configured to detect active and/or passive touch input, and the stylus 1 may be cooperatively configured to provide active and/or passive touch input.

When active touch input is enabled, the stylus 1 may be configured to generate an electrical signal that is detected by the touch sensor 4. In other implementations, the stylus 1 may be configured to provide passive touch input in which the stylus 1 does not produce an electrical signal corresponding to touch input.

In another example, the touch sensor 4 may be configured to detect passive touch input from a finger of a user. The touch sensor 4 may be configured to receive input from input sources in direct contact with a surface of the touch-sensitive display device 2, and/or, input from input sources not in direct contact with the touch-sensitive display device 2 (e.g., input devices that hover proximate to a surface of the touch-sensitive display device 2).

"Touch input" as used herein refers to both types of input. The touch sensor 4 may take any suitable form including, but not limited to, one or more of a capacitive touch sensor and/or display, a resistive touch sensor and/or display, and an optical touch sensor and/or display. In one example, the touch sensor 4 includes a matrix of electrodes that form capacitors whose capacitances may be evaluated in detecting touch input.

Furthermore, the stylus 1 may be configured to provide user input to the touch-sensitive display device 2 in forms other than direct touch input that is detected by the touch sensor 4. The touch-sensitive display device 2 may be configured to visually present appropriate graphical output 6 in response to receiving information from the stylus 1. Such information may be based on touch input as well as other user input. While described with reference to a touch-sensitive display device, stylus 1 may optionally be used with touch-sensing surfaces that do not include display functionality.

As examples, the touch-sensitive display device 2 may be a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

In other examples, the stylus 1 and the touch-sensitive display device 2 may operate as a standalone device or may be coupled (e.g., networked) to other machines. In a networked deployment, they may operate in the capacity of a server machine or a client machine in a server-client network environment, or as a peer machine in a peer-to-peer (or distributed) network environment. Some examples includes a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions, sequentially or otherwise, that specify actions to be taken by a machine.

The stylus 1 and the touch-sensitive display device 2 may include a wide variety of components to receive input, provide output, produce output, transmit information, exchange information, capture measurements, and so on. It will be appreciated that the stylus 1 and the touch-sensitive display device 2 may include many other components that are not shown in the FIGS.

The stylus 1 and the touch-sensitive display device 2 may include tactile input components (e.g., a physical button, a touch screen that provides location and/or force of touches or touch gestures, or other tactile input components), audio input components (e.g., a microphone), and the like.

In further examples, the stylus 1 and/or the touch-sensitive display device 2 may include biometric components, motion components, environmental components, or position components, among a wide array of other components. The biometric components may include components to detect expressions (e.g., hand expressions, facial expressions (e.g., by using a camera), vocal expressions, body gestures, or eye tracking), measure bio signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth.

The environmental components may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

The position components may include location sensor components (e.g., a Global Position System (GPS) receiver component), altitude sensor components (e.g., altimeters or barometers that detect air pressure from which altitude may be derived), orientation sensor components (e.g., magnetometers), and the like.

The stylus 1 and/or the touch-sensitive display device 2 may include communication components operable to couple at least one of them to a network or devices via a coupling. As examples, the communication components may include a network interface component or other suitable device to interface with wired communication components, wireless communication components, cellular communication components, Near Field Communication (NFC) components, Bluetooth® components (e.g., Bluetooth® Low Energy), Wi-Fi® components, and other communication components to provide communication via other modalities.

Moreover, the communication components may detect identifiers or include components operable to detect identifiers. For example, the communication components may include Radio Frequency Identification (RFID) tag reader components, NFC smart tag detection components, optical reader components, or acoustic detection components (e.g., microphones to identify tagged audio signals).

FIGS. 2-9 illustrate an example stylus 1 in various configurations utilizing the same reference numbers for the same elements. The stylus 1 includes a cover 10 and a base fastener 12 supported by the cover 10. A base segment 20 is secured to the cover 10. The base segment 20 may be secured to the cover 10 in any manner that is known now or discovered in the future. As examples, the base segment 20 may be secured to the cover 10 with an adhesive or the cover 10 may be screwed on the base segment 20 using internal or external threads. A base spring 29 engages the cover 10 and is disposed at least partially within the base segment 20.

The stylus 1 further includes an intermediate segment 30 that has an intermediate stop 31 and an intermediate fastener 32 that form part of the intermediate segment 30. The intermediate segment 30 is longitudinally movable inside the base segment 20 such that the intermediate segment 30 is movable between a closed position (see FIGS. 2, 7, 8 and 9) where the intermediate fastener 32 engages the base fastener 12 or another portion of the base segment 20, and an open position (see FIGS. 3, 4, 5, and 6) where the base spring 29 biases the intermediate stop 31 away from the cover 10 such that a portion of the intermediate segment 30 extends longitudinally from the base segment 20.

Figure 10:
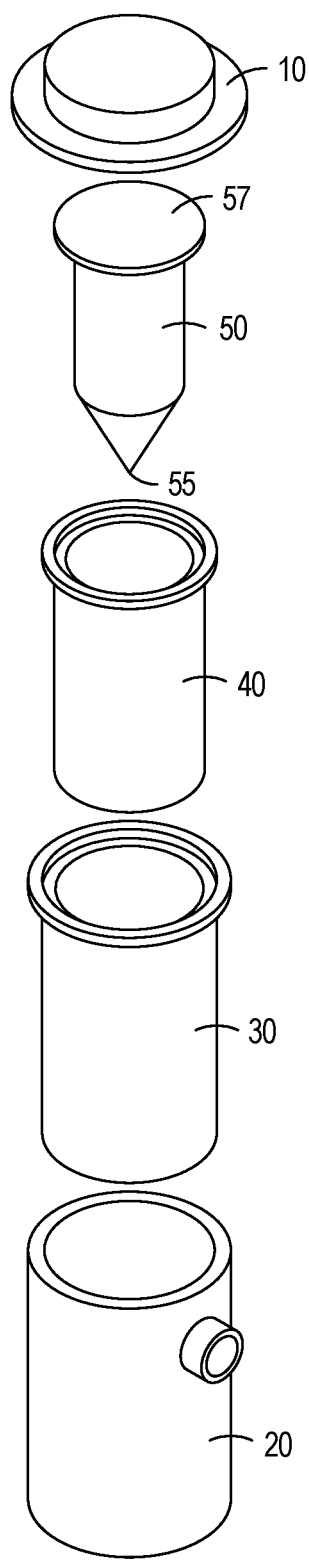
FIG. 10 is a perspective exploded view of the external parts of the example stylus of FIGS. 2-9.

The base spring 29 is positioned between the cover 10 and the intermediate stop 31 (see also FIG. 10). An intermediate spring 39 engages the intermediate stop 31 and is at least partially disposed within the intermediate segment 30.

The stylus 1 further includes an end segment 40 that has an end stop 41 and an end fastener 42 that are formed as part of the end segment 40. The end segment 40 is longitudinally movable inside of the intermediate segment 30 such that the end segment 40 is movable between a closed position (see FIGS. 2, 3, 6, and 8) where the end fastener 42 engages the intermediate stop 31 and an open position (see FIGS. 4, 5, 7, and 9) where the intermediate spring 39 biases the end stop 41 away from the intermediate stop 31 such that a portion of the end segment 40 extends longitudinally from the intermediate segment 30. As shown most clearly in FIG. 11, the intermediate spring 39 is positioned between the intermediate stop 31 and the end stop 41.

The stylus 1 further includes a tip 50 for engaging a touch sensitive electronic device (see, e.g., stylus 1 in FIG. 1). The tip 50 extends from the end segment 40.

In the illustrated example forms, the base segment 20, the intermediate segment 30 and the end segment 40 each include axial bores 23, 33, 43. The intermediate segment 30 is longitudinally movable within the axial bore 23 in the base segment 20, and the end segment 40 is longitudinally movable within the axial bore 33 in the intermediate segment 30. In some forms, the tip 50 is longitudinally movable within the axial bore 43 in the end segment 40.

As an example, the axial bores 23, 33, 43 may be cylindrical. It should be noted that the axial bores 23, 33, 43 may be other shapes depending the desired configuration for the stylus 1. The only limitation for the shape of the axial bores 23, 33, 43 and the base segment 20, the intermediate segment 30 and the end segment 40 is that the end segment 40 must be able to longitudinally move within the intermediate segment 30 and the intermediate segment 30 must be able to longitudinally move within the base segment 20. As examples, the base segment 20, the intermediate segment 30 and the end segment 40 may be elongated cylindrical segments, or segments having a polygonal transverse cross section.

There are forms of the stylus 1 where there is a friction fit between the base segment 20 and the intermediate segment 30 as well as a friction fit between the end segment 40 and the intermediate segment 30. The degree of friction between the base segment 20 and the intermediate segment 30 and between the end segment 40 and the intermediate segment 30 will depend on a number of factors, including the amount of force that is desired in order to manipulate the end segment 40 relative to the intermediate segment 30 and to manipulate the intermediate segment 30 relative to the end segment 20. Some other factors include the types of materials that form the base segment 20, the intermediate segment 30 and the end segment 40 as well as any manufacturing tolerances that are associated with fabricating the end segment 20, the intermediate segment 30 and the end segment 40.

Another factor relative to the degree of friction between the base segment 20 and the intermediate segment 30 as well as between the intermediate segment 30 and the end segment 40 are the designs of the base spring 29 and the intermediate spring 39. There a variety of design considerations associated with selecting a base spring 29 and an intermediate spring 39, including but not limited to, the initial length of the base spring 29 and the intermediate spring 39 and the final length of the base spring 29 and the intermediate spring 39 as well as the material that is used for the base spring 29 and intermediate spring 39.

In addition, the wire diameter and number of turns per given length are also design considerations for the base spring 29 and intermediate spring 39. The parameters of the wire that are used to form the springs define spring constants of the springs. The spring constants are selected to minimize relative movement of the segments once the length is adjusted by applying longitudinal force to obtain a desired length.

In the illustrated example forms of the stylus 1, the base fastener 12 is a base magnet 12, the intermediate fastener 32 is an intermediate magnet 32 and the end fastener 42 is an end magnet 42. The degree of magnetic force that is associated with each of the base magnet 12, the intermediate magnet 32 and the end magnet 40 will primarily depend on the spring force of the base spring 29 and the intermediate spring 39. In addition, the friction fit between the base segment 20 and the intermediate segment 30 and the friction fit between intermediate segment 30 and the end segment 40 will also factor into the magnetic force that is utilized for the base magnet 12, the intermediate magnet 32 and the end magnet 42.

In the example forms of the stylus 1 that are shown in the FIGS., the base magnet 12, the intermediate magnet 32 and the end magnet 42 are electromagnets, and the stylus 1 further includes a battery 70. The battery 70 provides electrical energy to the electromagnets 12, 32, 42 in order to magnetize each of the electromagnets 12, 32, 42.

In one example form, the battery 70 continuously provides power to each of the electromagnets 12, 32, 42. The battery 70 may be rechargeable or replaceable. The degree of electrical energy that is provided by the battery 70 will depend in part on the life of the battery 70 that is desired for the stylus 1, the space available within the stylus 1 and/or the amount of electrical energy that is required in order to properly magnetize each of the electromagnets 12, 32, 42 during operation of the stylus 1 (among other factors). It should be noted that although the battery 70 is shown in the FIGS. as being in the end segment 40, the battery 70 may be located on one or more other segments of the stylus 1.

Description of the Operation of the Stylus

The stylus 1 may further include a switch 80 (e.g., on an outer surface of the stylus 1). The switch 80 may be operated to disconnect the battery 70 from each of the electromagnets 12, 32, 42. When the switch 80 is operated to disconnect the battery 80 from the electromagnets 12, 32, 42, the intermediate segment 30 and the end segment 40 may each be moved (individually or together) from the closed position to the open position (or part of the way to the open position).

Therefore, the switch 80 serves to selectively disconnect the electromagnets 12, 32, 42 from the electrical energy that is provided by the battery 70, which then allows the base spring 29 and the intermediate spring 39 to force the intermediate stop 31 away from the cover 10 and the end stop 41 away from the intermediate stop 31. The degree to which the intermediate segment 30 is moved away from the base segment 20 and the end segment 40 is moved away the intermediate segment 30 will depend in part on the spring force that is generated by the base spring 29 and the intermediate spring 39 versus the degree of friction fit between the base segment 20 and the intermediate segment 30 as well as the degree of friction fit between intermediate segment 30 and the end segment 40.

In some forms, the spring force that is generated by the base spring 29 and the intermediate spring 39 may not be enough to overcome the friction fit between the base segment 20 and the intermediate segment 30 as well as the friction fit between the intermediate segment 30 and the end segment 40. In such cases, a user may have to manually manipulate the intermediate segment 30 and the end segment 40 between the closed and open positions.

It should be noted that other forms of the stylus 1 do not include springs. As an example, the base spring 29 and the intermediate spring 39 would not be included as well as the intermediate stop 31 and the end stop 41.

Therefore, the intermediate segment 31 would be held in the closed position within the base segment 20 by the base fastener 12 and/or the intermediate fastener 32. In addition, the end segment 41 would be held in the closed position within the intermediate segment 30 by the end fastener 42. The intermediate stop 31 and the end stop 41 may or may not be included depending on the magnetic properties of the various components in the stylus 1. In other words, the base fastener 12, the intermediate fastener 32 and the end fastener 42 may need something to magnetically attach to in order to secure the intermediate segment 30 and/or the end segment 40 in their respective closed positions.

In forms of the stylus 1 with no internal springs, the friction fit between the end segment and the intermediate segment 39 as well as the friction fit between the end segment 40 and the intermediate segment 30 would have to permit a user to individually manipulate the intermediate segment 30 and the end segment 30 relative to one another once the end segment 40 and the intermediate segment 30 are disengaged from their respective fasteners 12, 32, 42.

One of the benefits that results from the configuration of the stylus 1 is that a user may maneuver the intermediate segment 30 independently of maneuvering the end segment 40 as the intermediate segment 30 is moved between the open and closed positions within the base segment 20. As an example, the intermediate segment 30 may be maneuvered to the closed position within the base segment 20 and held in place using the energized base electromagnet 12 without regard to any movement or manipulation of the end segment 40.

In addition, a user may maneuver the end segment 40 independently of maneuvering the intermediate segment 30 as the end segment 40 is moved between the open and closed positions within the intermediate segment 30. As an example, the end segment 40 may be maneuvered to the closed position within the intermediate segment 30 and held in place using the energized end electromagnet 42 without regard to any movement or manipulation of the intermediate segment 30.

In the example forms of the stylus 1 that are illustrated in the FIGS., the stylus 1 may further include an end spring 49 that engages the end stop 41 and is disposed at least partially within the end segment 40. The tip 50 is longitudinally movable within the end segment 40 such that the tip 40 is movable between a closed position (see FIGS. 2, 3, 4 and 7) where the tip 50 engages the end stop 41 and an open position (see FIGS. 5, 6, 8 and 9) where the end spring 49 biases the tip 50 away from the end stop 41 such that a portion of the tip 50 extends longitudinally from the end segment 40.

In some forms, the tip 50 further includes a head 55 at one end that is configured to engage the electronic device (see FIG. 1), and a foot 57 at an opposing end. The foot 57 prevents the tip 50 from fully exiting the end segment 40.

There are forms of the stylus 1 where the foot 57 of the tip 50 has a friction fit with the end segment 40 that is similar to the friction fits described above between the base segment 20 and the intermediate segment 30 as well as the intermediate segment 30 and the end segment 40. In addition, the end spring 49 may be configured in a manner that is similar to the configurations described above relative to base spring 29 and intermediate spring 39.

The tip 50 may further include a tip magnet 52 (e.g., an electromagnet as described above) in the foot 57 of the tip 50. The tip magnet 52 secures the tip 50 in the closed position when the switch 80 is unoperated and the battery 70 provides power to the tip magnet 52. When the switch 80 is operated to disconnect the battery 70 from the tip magnet 52, the tip 50 may be moved from the closed position within the end segment 40 where the tip magnet 52 engages the end stop 41 to the open position where the tip 50 is more exposed from the end segment 40.

It should be noted that there are forms of the stylus 1 where the intermediate stop 31 is secured to the intermediate segment 30 and the end stop 41 is secured to the end segment 40. In other forms, the intermediate stop 31 may move relative to the intermediate segment 30 and the end stop 41 may move relative to the end segment 40 as the intermediate segment 30 is moved relative to the base segment and the end segment 40 is moved relative to the intermediate segment 30.

A description of each figure is being provided in order to provide clarity as to when the intermediate segment 30, the end segment 40 and the tip 50 are in the open and closed positions.

Figure 2:
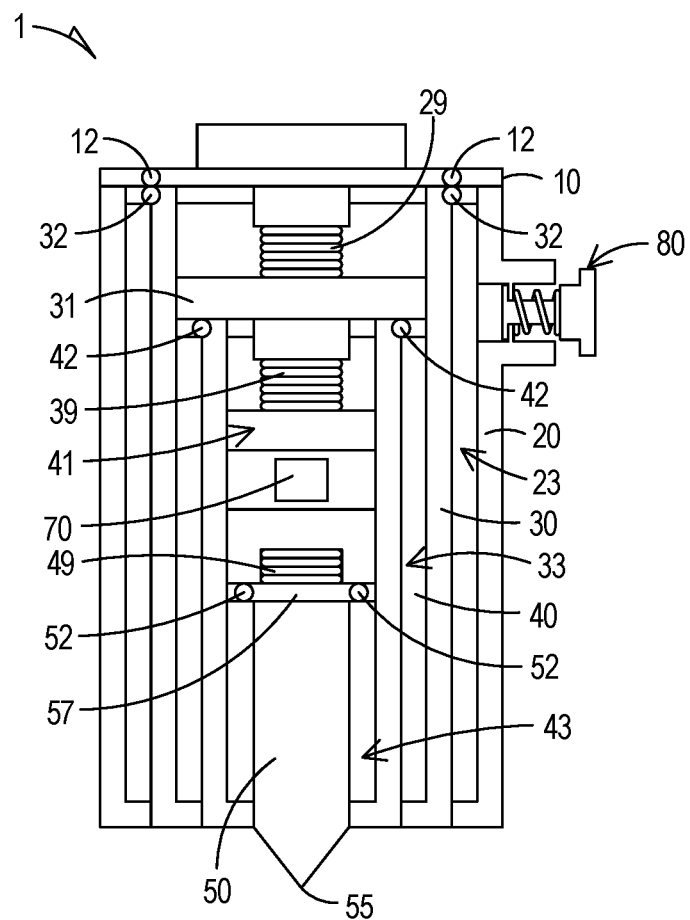
FIG. 2 is a cross section representation of an example stylus in a fully closed position.

FIG. 2 shows the stylus 1 where the intermediate segment 30, the end segment 40 and the tip 50 are all in the closed position.

Figure 3:
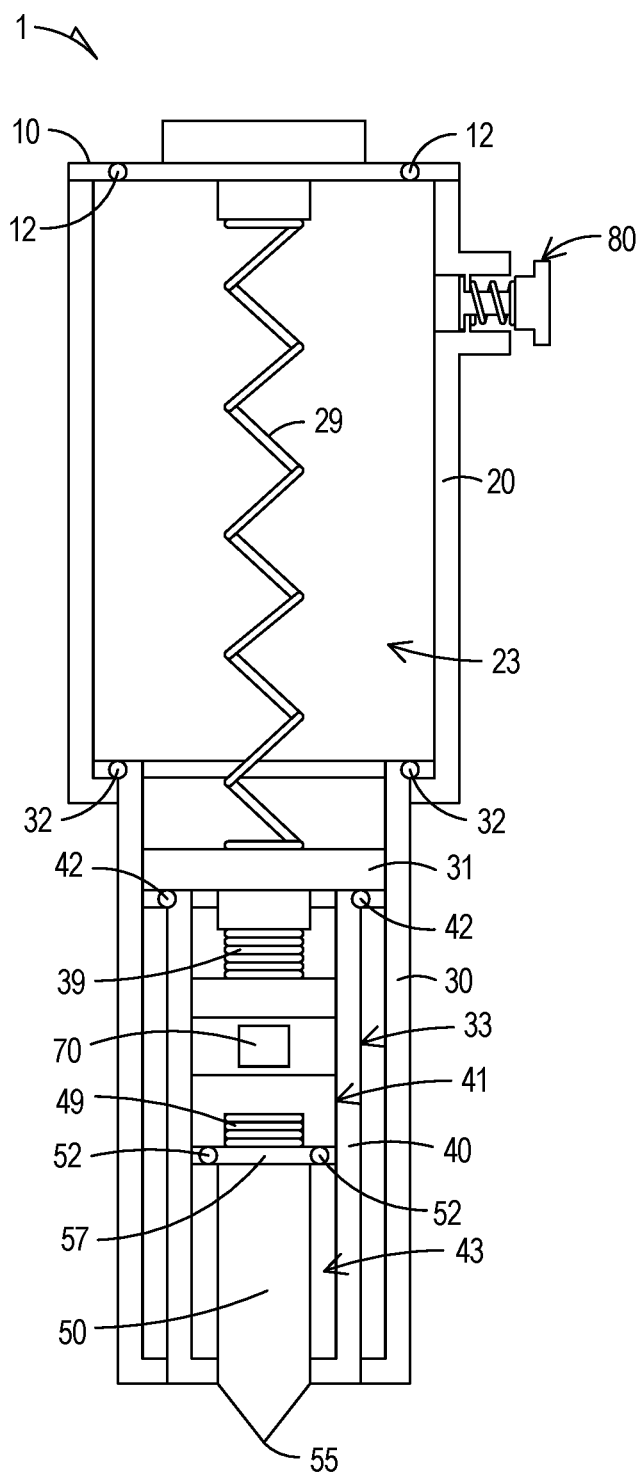
FIG. 3 is a cross section representation of the example stylus of FIG. 2 with an intermediate segment of the stylus opened.

FIG. 3 shows the stylus 1 where the intermediate segment 30 is in the open position and the end segment 40 and tip 50 are in the closed position.

Figure 4:
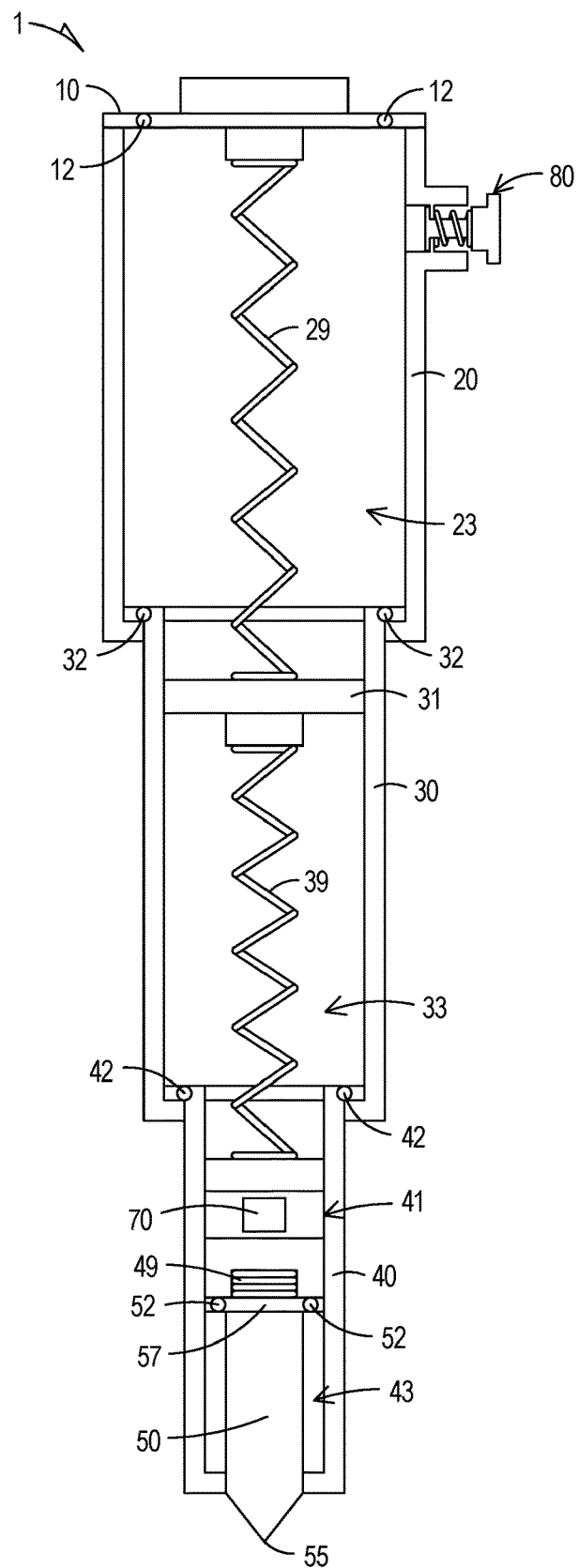
FIG. 4 is a cross section representation of the example stylus of FIGS. 2 and 3 with the intermediate segment and an end segment of the stylus opened.

FIG. 4 shows the stylus 1 where the intermediate segment 30 and the end segment 40 are in the open position and the tip 50 is in the closed position.

Figure 5:
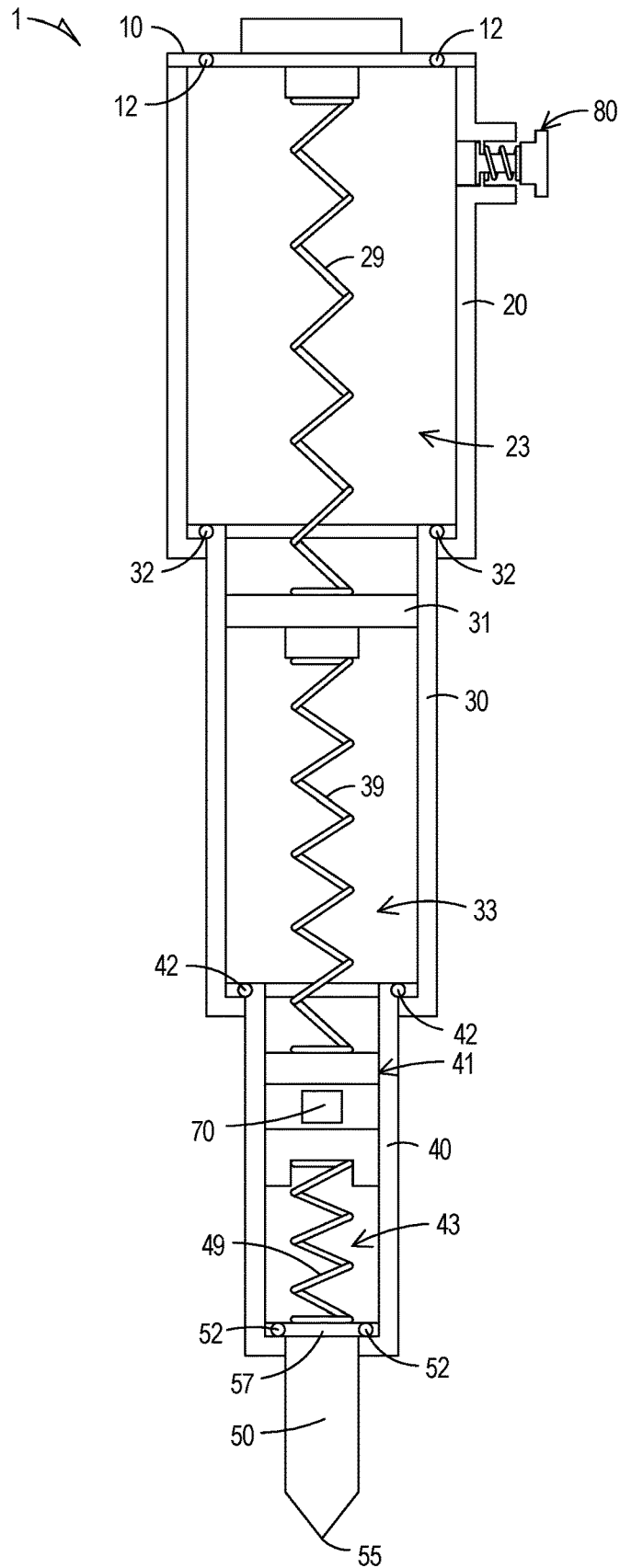
FIG. 5 is a cross section representation of the example stylus of FIGS. 2-4 with the intermediate segment, the end segment and a tip of the stylus opened.

FIG. 5 shows the stylus 1 where the intermediate segment 30, the end segment 40 and the tip 50 are in the open position.

Figure 6:
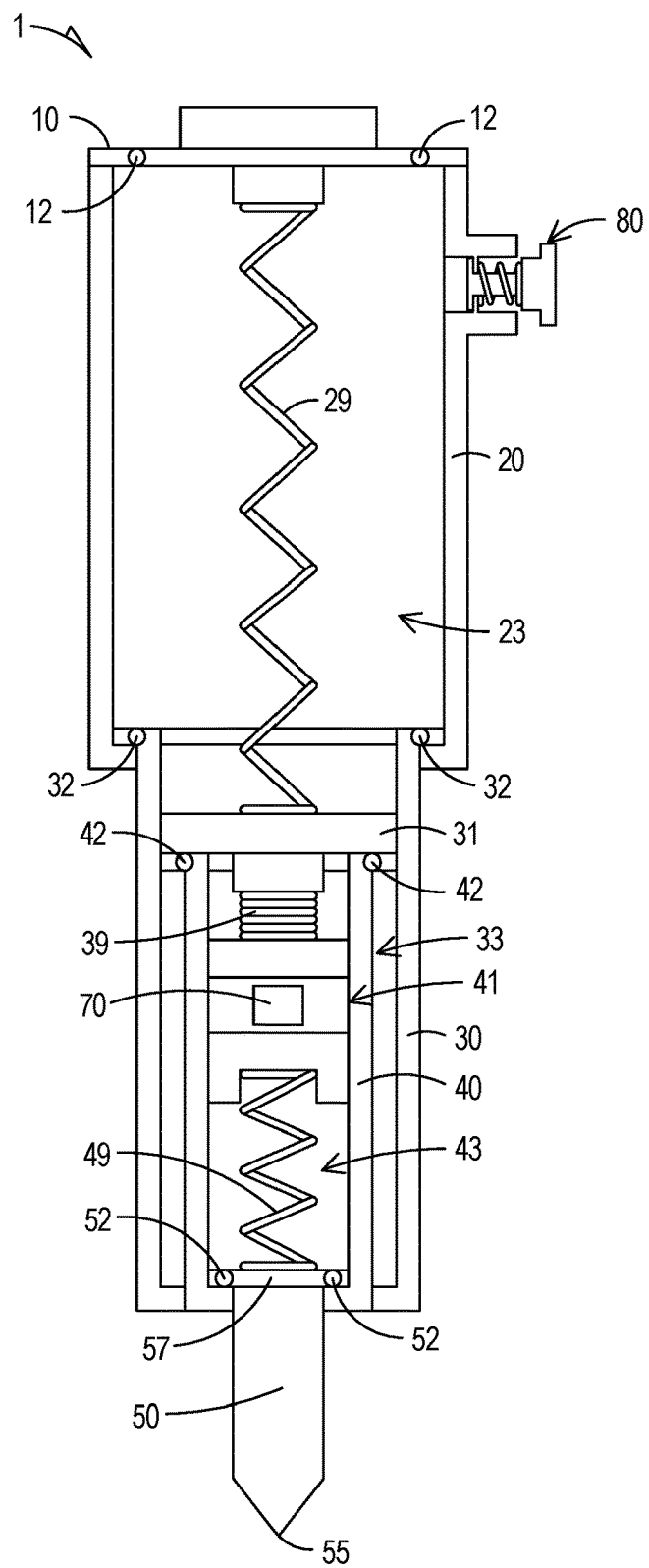
FIG. 6 is a cross section representation of the example stylus of FIGS. 2-5 with the intermediate segment and the tip of the stylus opened.

FIG. 6 shows the stylus 1 where the intermediate segment 30 and the tip 50 are in the open position and the end segment 40 is in the closed position.

Figure 7:
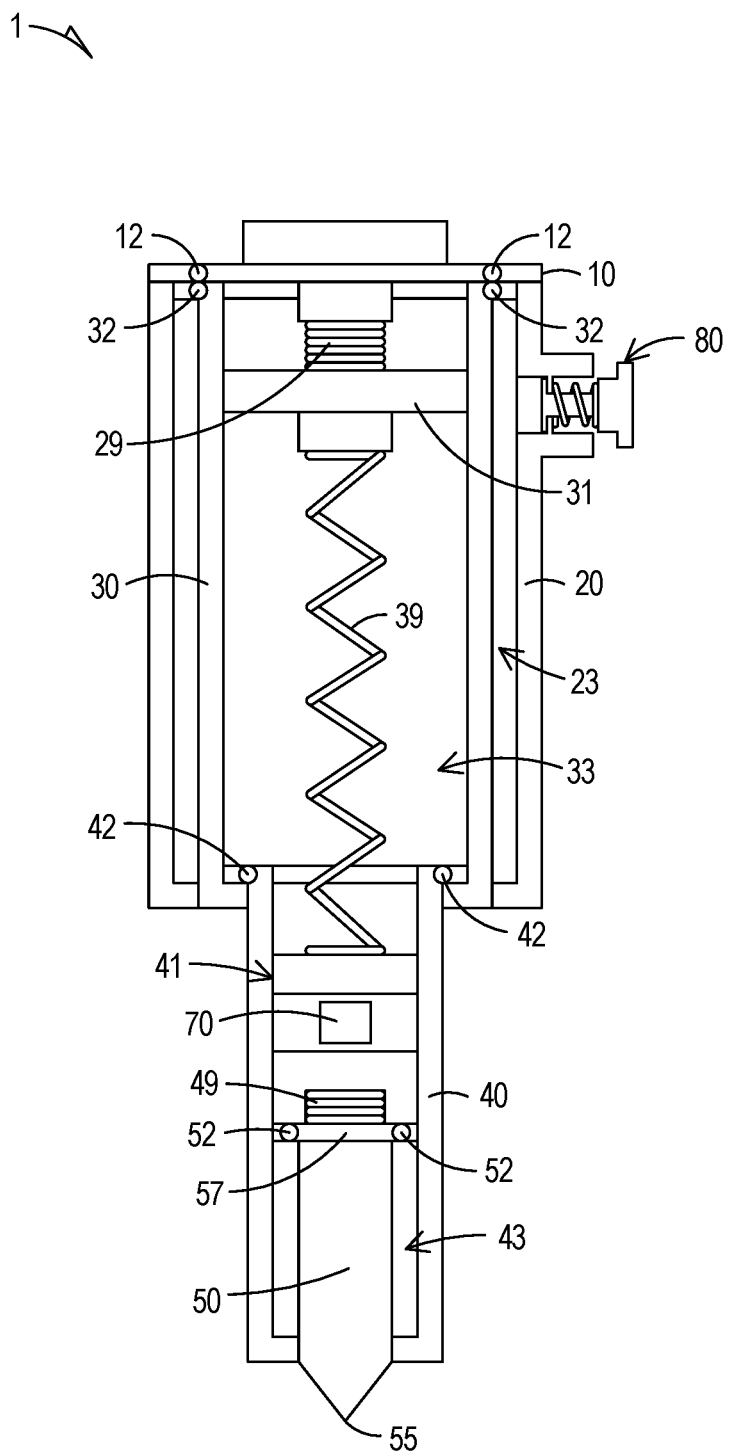
FIG. 7 is a cross section representation of the example stylus of FIGS. 2-6 with the end segment of the stylus opened.

FIG. 7 shows the stylus 1 where the intermediate segment 30 and the tip 50 are in the closed position and the end segment 40 is in the open position.

Figure 8:
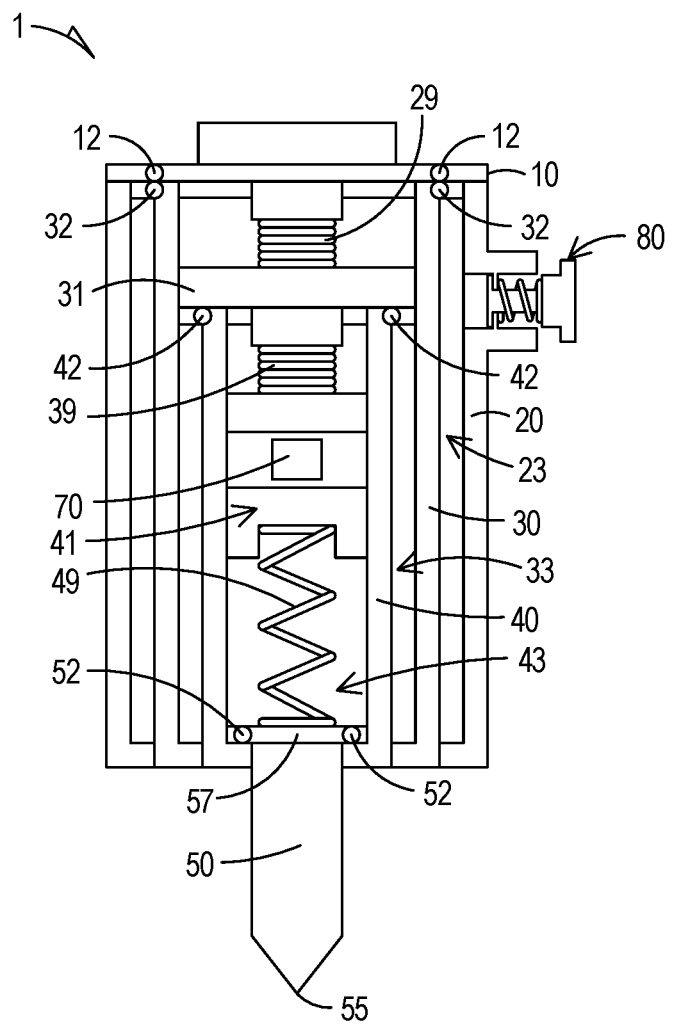
FIG. 8 is a cross section representation of the example stylus of FIGS. 2-7 with the tip of the stylus opened.

FIG. 8 shows the stylus 1 where the intermediate segment 30 and the end segment 40 are in the closed position and the tip 50 is in the open position.

Figure 9:
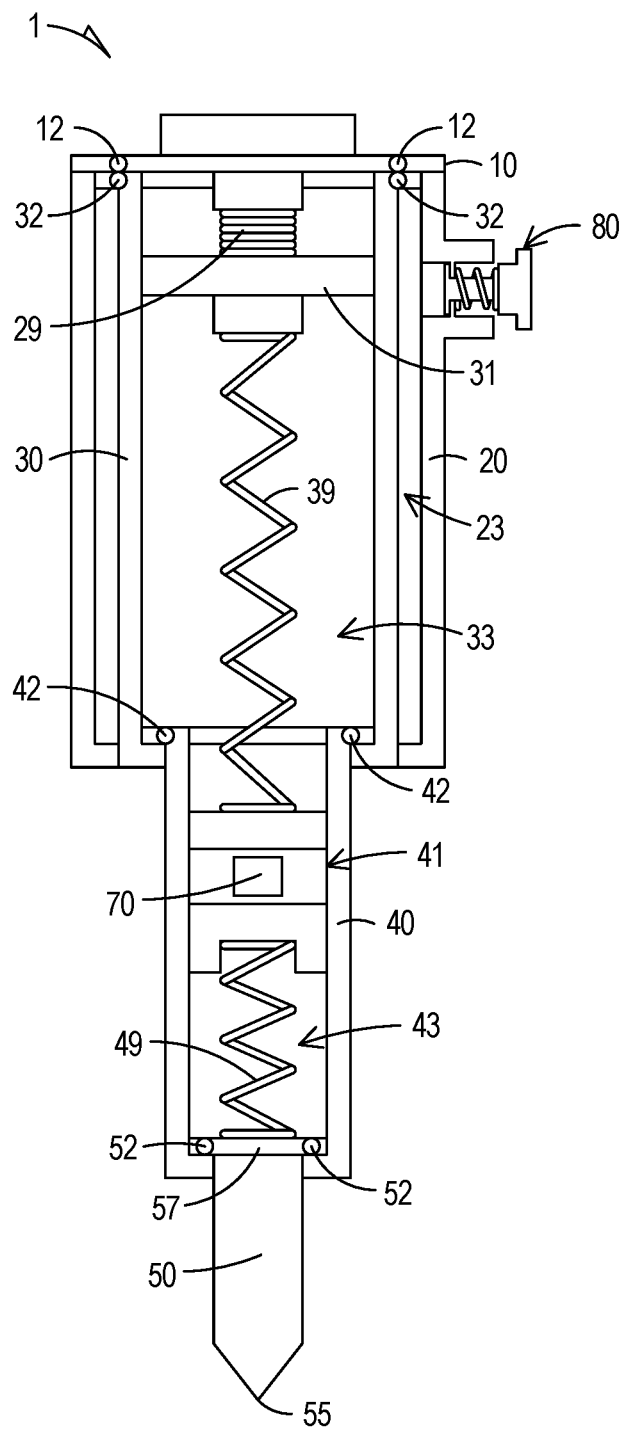
FIG. 9 is a cross section representation of the example stylus of FIGS. 2-9 with the end segment and the tip of the stylus opened.

FIG. 9 shows the stylus 1 where the intermediate segment 30 is in the closed position and the end segment 40 and tip 50 are in the open position.

FIG. 10 shows an exploded view of the external parts of the stylus 1. FIG. 10 is provided for the sake of clarity and shows how the external pieces would be assembled together to form the stylus 1. As in illustration, intermediate segment 30 would be dropped into base segment 20, then end segment 40 would be dropped into intermediate segment 30, then the tip 50 would be dropped into the end segment 40. The cover 10 would then be secured to the base segment 20.

Figure 11:
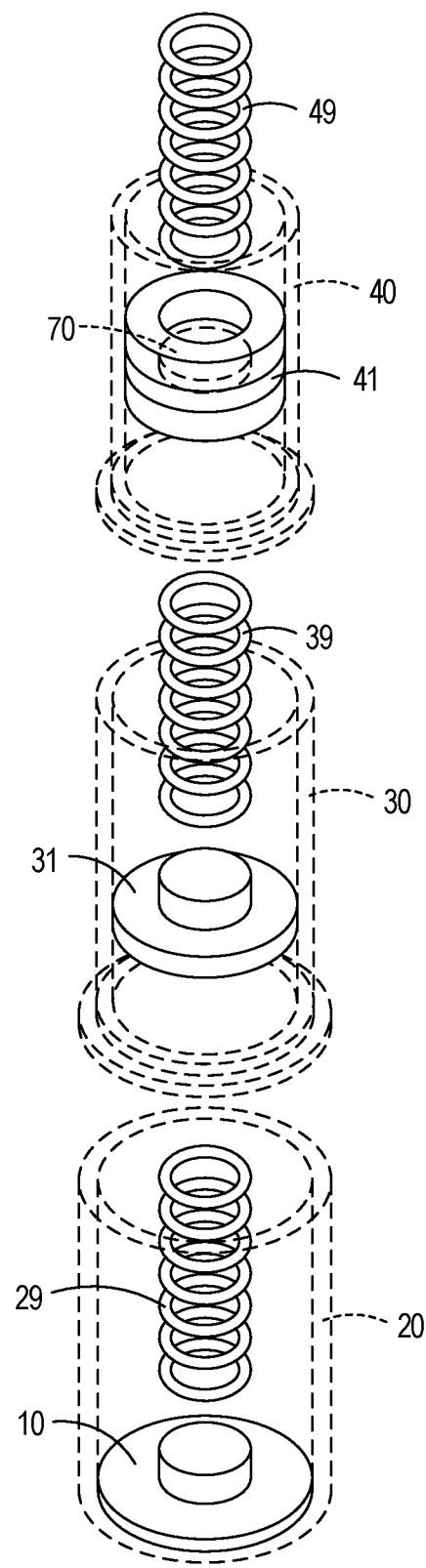
FIG. 11 is a perspective exploded view similar to FIG. 10 of the internal parts of the example stylus of FIGS. 2-9.

FIG. 11 shows an exploded view of the interior parts of the stylus 1. FIG. 11 clarifies how the cover 10, base spring 29, intermediate stop 31, intermediate spring 39, end stop 41 and end spring 49 would be arranged and aligned within the stylus 1. The base spring 29 is compressed between the cover 10 and the intermediate stop 31 and the intermediate spring 39 is compressed between the intermediate stop 31 and the end stop 41. In addition, the end spring 49 is compressed between the end stop 41 and the foot 57 of the tip 50 (tip 50 not shown in FIG. 11).

Figure 12:
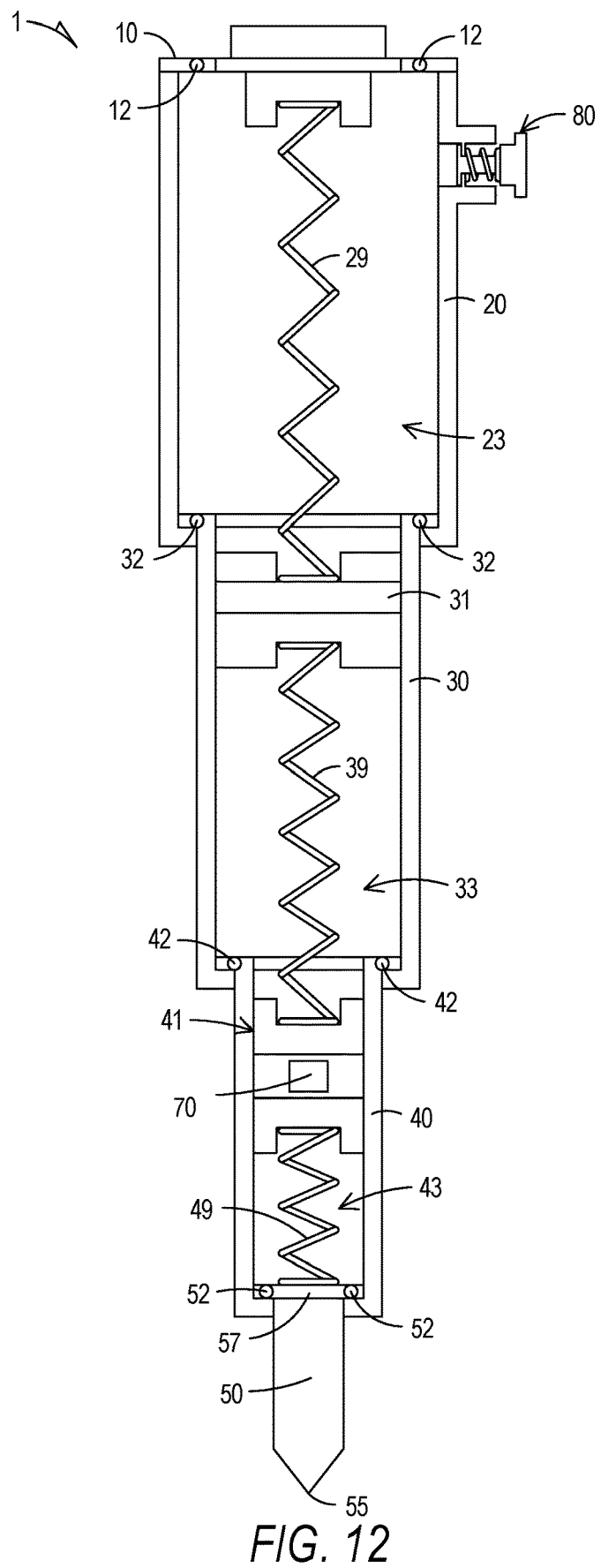
FIG. 12 is a cross section representation of stylus similar to FIG. 5 illustrating another example form of the stylus.

FIG. 12 shows another example form of the stylus 1. The stylus 1 shown in FIG. 12 is similar to the stylus 1 shown in FIG. 5 where the intermediate segment 30, the end segment 40 and the tip 50 are all in the open position. The difference between the stylus 1 shown in FIG. 12 and the stylus 1 shown in FIG. 5 is that the base spring 29, the intermediate spring 39 and the end spring 49 are all positioned within recesses in the cover 10, the intermediate stop 31 and the end stop 41.

The recesses may allow the base spring 29, the intermediate spring 39 and the end spring 49 to be assembled in the stylus 1 without some additional attachment method that would otherwise be required for the base spring 29, the intermediate spring 39 and the end spring 49. The base spring 29, the intermediate spring 39 and the end spring 49 may merely be positioned within the recesses of the respective cover 10, intermediate stop 31 and end stop 41 as the base spring 29, the intermediate spring 39 and the end spring 49 are assembled within the interior of the stylus 1.

In addition, the recesses may provide a degree of mechanical support to the base spring 29, the intermediate spring 39 and the end spring 49. The degree of mechanical support provided by the recesses will depend in part on the diameter and depth of the recesses. It should be noted that recesses may be included in one, some or all of the cover 10, intermediate stop 31 and end stop 41 depending on the desired configuration and/or manufacturing processes that are associated with the stylus 1.

Figure 13A:
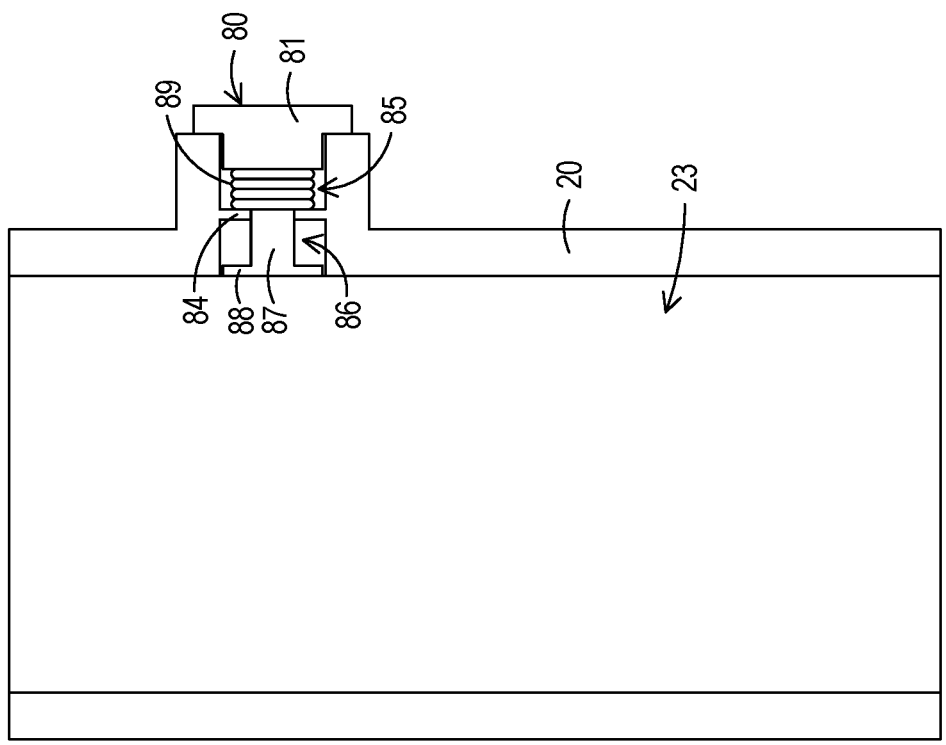
FIGS. 13A and 13B show enlarged views of an example base segment and switch that may be used in the example stylus of FIGS. 2-9.
Figure 13B:
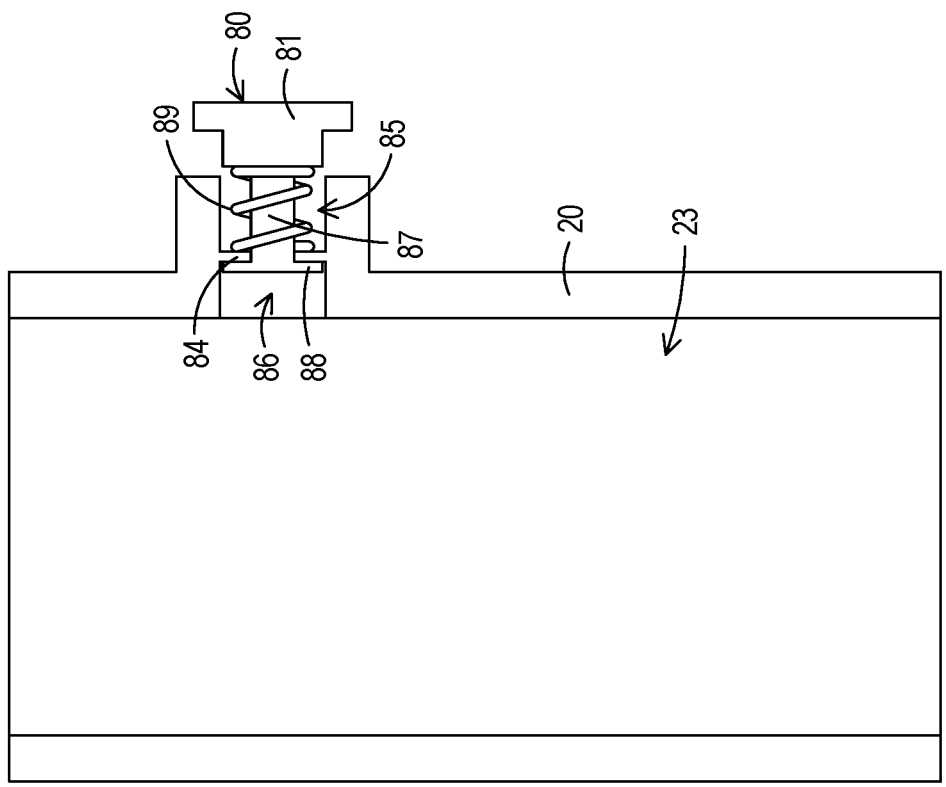

FIGS. 13A and 13B are enlarged views of the base segment 20 including the switch 80. FIG. 13A shows the switch 80 in an unoperated condition. In some forms and as described above, the switch 80 may permit electrical connection between the battery 70 and the various electromagnets 12, 32, 42 when the switch 80 is unoperated (see FIG. 13A).

FIG. 13B shows the switch 80 after being operated (i.e., pressed). As discussed above, this may break the electrical circuit that is formed between the battery 70 and the electromagnets 12, 32, 42 such that the battery 70 is unable to provide power to the electromagnets 12, 32, 42.

The electrical circuit between the battery 70 and the switch 80 may be formed in any manner that is known now or discovered in the future. In one example form, the conductors that form the electrical circuit may include (at least in part) conductors on the interior surfaces that form the axial bores 23, 33, 43.

In the example form illustrated in FIGS. 13A and 13B, the switch 80 includes a head 81 that is movable within an opening 85 in the base segment 20. A switch spring 89 is positioned between a flange 84 on the base segment 20 and the head 81 such that the switch spring 89 biases the head away from the flange 84.

The switch spring 89 also forces a tail 88 of the switch 80 against the flange 84 of the base segment 20. The tail 88 of the switch 80 may provide the electrical connection between the separate areas of the flange 84 when the switch 80 is in the unoperated configuration shown in FIG. 13A. When the head 81 of the switch 80 is pressed (as shown in FIG. 13B), the tail 88 of the switch 80 moves away from the flange 84 thereby opening the electrical circuit between the battery 70 and the electromagnets 12, 32, 42.

At least a portion of the head 81 of the switch 80 is designed to fit within the opening 85 that is on one side of the flange 84. In addition, the tail 88 is designed to move within an opening 86 on the other side of the flange 84 as the head 81 of the switch 80 is pressed. It should be noted that the tail 88 of the switch 80 should not enter the axial bore 23 of the base segment 20 in order to permit the intermediate segment 30 to move between the closed and opened positions within the base segment 20.

The head 81 and the tail 88 of the switch 80 may be connected by a post 87. It should be noted that the size of the post 87 will depend in part on the type of switch spring 89 that is utilized to provide a proper biasing force in the switch 80. As discussed above with regard to the base spring 29, the intermediate spring 39 and the end spring 49, the overall size and configuration of the switch spring 89 will depend in part on the relative sizes of the various components in the switch 80 as well as the sizes of the openings 85, 86 in the base segment 20 (among other factors).

The switch 80 may have a variety of different mechanical implementations. Even though the switch 80 is illustrated in the FIGS. as a push button, there are other possible mechanical configurations (e.g., levers).

In addition, various electrical switches (and controllers) may be utilized for switch 80. The electrical switches may be utilized instead of, or in combination with, mechanical switches.

It should be noted that while the mechanical switch 80 is shown as being part of the base segment 20, the mechanical switch 80 may alternatively be part the cover 10. In addition, electrical switches may be in one or more other parts of the stylus 1. The switch 80 may have any switching configuration that is known now or discovered in the future.

Figure 14:
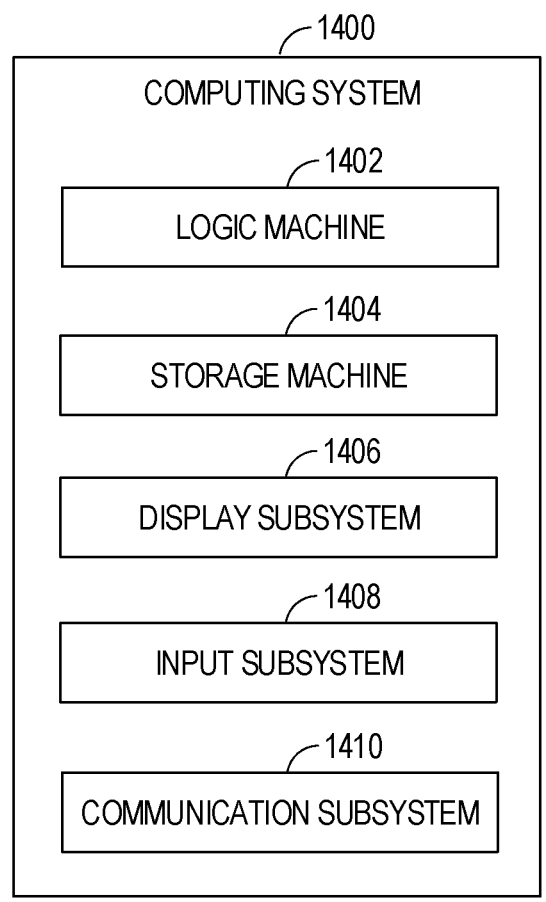
FIG. 14 is a block schematic representation of a non-limiting implementation of a computing system that can enact one or more of the styli described above.

FIG. 14 schematically shows a non-limiting implementation of a computing system 1400 that can enact one or more of the styli described above. Computing system 1400 is shown in simplified form.

Computing system 1400 may take the form of one or more stylus controllers, personal computers, server computers, tablet computers, home-entertainment computers, network computing devices, gaming devices, mobile computing devices, mobile communication devices (e.g., smart phone, smart watch, etc.), and/or other computing devices.

Computing system 1400 shows an example of the stylus 1 of FIG. 1, the display device 2 of FIG. 1, as well as other devices described herein. Computing system 1400 includes a logic machine 1402 and a storage machine 1404. Computing system 1400 may optionally include a display subsystem 1406, input subsystem 1408, communication subsystem 1410, and/or other components not shown in FIG. 14.

Logic machine 1402 includes one or more physical devices configured to execute instructions. For example, the logic machine 1402 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1402 may include one or more processors configured to execute software instructions. Additionally, or alternatively, the logic machine 1402 may include one or more hardware or firmware logic machines configured to execute hardware or firmware instructions.

Processors of the logic machine 1402 may be single-core or multi-core, and the instructions executed thereon may be configured for sequential, parallel, and/or distributed processing. Individual components of the logic machine 1402 optionally may be distributed among two or more separate devices, which may be remotely located and/or configured for coordinated processing. Aspects of the logic machine 1402 may be virtualized and executed by remotely accessible, networked computing devices configured in a cloud computing configuration.

Storage machine 1404 includes one or more physical devices configured to hold instructions executable by the logic machine 1402 to implement the methods and processes described herein. When such methods and processes are implemented, the state of storage machine 1404 may be transformed (e.g., to hold different data).

Storage machine 1404 may include removable and/or built-in devices. Storage machine 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program and application-specific standard products (PSSP/ASSPs), system-on-a-chip (SOC), and complex programmable logic devices (CPLDs), for example.

When included, display subsystem 1406 may be used to present a visual representation of data held by storage machine 1404. This visual representation may take the form of a graphical user interface (GUI). The styli and methods described herein may change the data held by the storage machine 1404, and thus transform the state of the storage machine 1404. In addition, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may include the styli described herein, and/or may comprise or interface with one or more user-input devices such as a keyboard, mouse, touch screen, or game controller. In some implementations, the input subsystem 1408 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple computing system 1400 with one or more other computing devices. Communication subsystem 1410 may include wired and/or wireless communication devices compatible with one or more different communication protocols. As non-limiting examples, the communication subsystem 1410 may be configured for communication via a wireless telephone network, or a wired or wireless local or wide-area network. In some implementations, the communication subsystem 1410 may allow computing system 1400 to send and/or receive messages to and/or from other devices via a network such as the Internet.

The styli described herein are readily able to provide a suitable ergonomic design for different users. Separate users often prefer different sizes for a stylus. The example styli described herein allow users to easily manipulate the stylus more toward their customized ergonomic size. The ability to make a stylus have an improved ergonomic feel for a user may promote a superior work product and longer work intervals when utilizing a stylus with an electronic device resulting in a better user experience.

In addition, the styli described herein are capable of being manipulated into a reduced size (i.e., a smaller footprint). The smaller size permits easier storage of the stylus when the stylus is to be used with a portable electronic device (e.g., a phone tablet or laptop).

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and nonobvious combinations and sub-combinations of the various processes, systems and configurations, and other features, functions, acts, and/or properties disclosed herein, as well as any and all equivalents thereof.

What is claimed is:

1. A stylus comprising:
a cover
a base fastener supported by the cover;
a base segment secured to the cover;
a base spring engaging the cover and being disposed at least partially within the base segment;
an intermediate segment that includes an intermediate stop and an intermediate fastener that form part of the intermediate segment, the intermediate segment being longitudinally movable inside the base segment such that the intermediate segment is movable between a closed position where the intermediate fastener engages the base fastener and an open position where the base spring biases the intermediate stop away from the cover such that a portion of the intermediate segment extends longitudinally from the base segment;
an intermediate spring engaging the intermediate stop and being disposed at least partially within the intermediate segment;
an end segment that includes an end stop and an end fastener that form part of the end segment, the end segment being longitudinally movable inside the intermediate segment such that the end segment is movable between a closed position where the end fastener engages the intermediate stop and an open position where the intermediate spring biases the end stop away from the intermediate stop such that a portion of the end segment extends longitudinally from the intermediate segment;
a tip supported by and extending from the end segment.

2. The stylus of claim 1, wherein the base segment, the intermediate segment and the end segment each include axial bores such that the intermediate segment is longitudinally movable within the axial bore in the base segment, the end segment is longitudinally movable within the axial bore in the intermediate segment and the tip is longitudinally movable within the axial bore in the end segment.

3. The stylus of claim 2, wherein each of the axial bores is cylindrical.

4. The stylus of claim 1, wherein the base fastener is a base magnet, the intermediate fastener is an intermediate magnet and the end fastener is an end magnet.

5. The stylus of claim 4, wherein the base magnet, the intermediate magnet and the end magnet are each electromagnets, and the stylus further comprises a battery that is selectively electrically couplable to the electromagnets to provide electrical energy in order to magnetize each of the electromagnets.

6. The stylus of claim 5, wherein the battery continuously provides electrical energy to each of the electromagnets.

7. The stylus of claim 6, further comprising a switch operable to disconnect the battery from each of the electromagnets.

8. The stylus of claim 7, wherein the intermediate segment and the end segment are each movable from the closed position to the open position when the switch is operated to disconnect the battery from the electromagnets.

9. The stylus of claim 8, wherein the intermediate segment is movable within the base segment between the open position and the closed positioned independently of maneuvering the end segment, and wherein the end segment is movable within the intermediate segment between the open position and the closed position independently of maneuvering the intermediate segment.

10. The stylus of claim 7, further comprising an end spring engaging the end stop and being disposed at least partially within the end segment, the tip being longitudinally movable inside the end segment such that the tip is movable between a closed position where the tip engages the end stop and an open position where the end spring biases the tip away from the end stop such that a portion of the tip extends longitudinally from the end segment.

11. The stylus of claim 10, wherein tip further includes:
a head at one end;
a foot an opposing end, wherein the head is configured to engage an electronic device and the foot prevents the tip from fully exiting the end segment; and
a tip magnet formed as an electromagnet in the foot of the tip, the tip magnet secures the tip in the closed position when the switch is unoperated and battery provides power to the tip magnet.

12. The stylus of claim 11, wherein the tip may be moved from the closed position to the open position when the switch is operated to disconnect the battery from the tip magnet.

13. The stylus of claim 1, wherein the intermediate stop is secured to the intermediate segment and the end stop is secured to the end segment.

14. The stylus of claim 1, wherein the segments are sized to provide a friction fit between the base segment and the intermediate segment and a friction fit between the end segment and the intermediate segment.

15. A stylus comprising:
a cover;
a base magnet supported by the cover;
a base segment secured to the cover;
a base spring engaging the cover and being disposed at least partially within the base segment;
an intermediate segment that includes an intermediate stop and an intermediate magnet that form part of the intermediate segment, the intermediate segment being longitudinally movable inside the base segment such that the intermediate segment is movable between a closed position where the intermediate magnet engages the base magnet and an open position where the base spring biases the intermediate stop away from the cover such that a portion of the intermediate segment extends longitudinally from the base segment;
an intermediate spring at least partially within the intermediate segment;
an end segment that includes an end stop and an end magnet that form part of the end segment, the end segment sliding inside the intermediate segment such that the end segment is movable between a closed position where the end magnet engages the intermediate magnet and an open position where the intermediate spring biases the end stop away from the intermediate stop such that a portion of the end segment extends longitudinally from the intermediate segment;
a tip supported by and extending from the end segment.

16. The stylus of claim 15, wherein the base magnet, the intermediate magnet and the end magnet are each electromagnets, and the stylus further comprises:
a battery that is selectively electrically couplable to the electromagnets to provide electrical energy in order to magnetize each of the electromagnets, wherein the battery continuously provides electrical energy to the electromagnets; and
a switch operable to disconnect the battery from the electromagnets.

17. The stylus of claim 16, wherein the intermediate segment may be detached from the base magnet and the end segment may be detached from the intermediate magnet when the switch is operated to disconnect the battery from the electromagnets.

\* \* \* \* \*